(12) United States Patent
Breau et al.

(10) Patent No.: US 8,316,045 B1
(45) Date of Patent: Nov. 20, 2012

(54) DATABASE LINKING SYSTEM

(75) Inventors: Jeremy R. Breau, Leawood, KS (US);
Terry D. Nebergall, Gardner, KS (US);
Frederick C. Rogers, Olathe, KS (US);
Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 822 days.

(21) Appl. No.: 12/368,961

(22) Filed: Feb. 10, 2009

(51) Int. Cl.
*G06F 17/30* (2006.01)

(52) U.S. Cl. ..................................................... 707/770

(58) Field of Classification Search .................. 707/769, 707/770
See application file for complete search history.

(56) References Cited

U.S. PATENT DOCUMENTS

| | | | |
|---|---|---|---|
| 6,026,391 A * | 2/2000 | Osborn et al. ........................ 1/1 |
| 6,473,750 B1 * | 10/2002 | Petculescu et al. ............ 707/600 |
| 6,816,860 B2 * | 11/2004 | Yamamoto ..................... 707/703 |
| 7,395,258 B2 * | 7/2008 | Altinel et al. ........................... 1/1 |
| 7,707,192 B1 * | 4/2010 | Lu et al. .......................... 707/687 |
| 7,779,031 B2 * | 8/2010 | Grosset et al. ................. 707/770 |
| 7,797,333 B1 * | 9/2010 | Chapman et al. ............. 707/770 |
| 7,921,130 B2 * | 4/2011 | Hinshaw et al. .............. 707/769 |
| 7,984,043 B1 * | 7/2011 | Waas ............................. 707/718 |
| 2002/0007402 A1 * | 1/2002 | Thomas et al. ................ 709/217 |
| 2005/0289184 A1 * | 12/2005 | Dettinger et al. ............. 707/200 |
| 2006/0047648 A1 * | 3/2006 | Martin ............................... 707/4 |
| 2007/0156646 A1 * | 7/2007 | Komatsu et al. .................. 707/2 |
| 2009/0116404 A1 * | 5/2009 | Mahop et al. ................. 370/254 |

* cited by examiner

*Primary Examiner* — Jorge A Casanova

(57) ABSTRACT

A method for linking database table elements across a plurality of databases is provided. The method comprises submitting a query to a first database specifying a first data element and a second data element, wherein the second data element resides in a table in the first database and determining that a table containing the first data element specified in the query is not present in the first database, a component resident in the first database sending a message to a second database requesting identification of tables containing data element associations that include the first data element, connecting a data element association across the first and second databases to identify at least one linking path between the first data element and the second data element, and selecting one of the linking paths of data element associations to link the first data element and the second data element and executing the query.

16 Claims, 6 Drawing Sheets

DATABASE LINKING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Information processed by multiple applications in large organizations may become spread over distant and disparate databases. Redundancy and synchronization of data may become problems when applications using the data are controlled by different groups within an organization. Issues may arise regarding which of several data sources is authoritative. Management may lose track of what data exists in the organization.

SUMMARY

In an embodiment, a method for linking database table elements across a plurality of databases is provided. The method comprises submitting a query to a first database specifying a first data element and a second data element, wherein the second data element resides in a table in the first database and determining that a table containing the first data element specified in the query is not present in the first database. The method also comprises a component resident in the first database sending a message to a second database requesting identification of tables containing data element associations that include the first data element. The method also comprises connecting a data element association across the first and second databases to identify at least one linking path between the first data element and the second data element. The method also comprises selecting one of the linking paths of data element associations to link the first data element and the second data element and executing the query.

In another embodiment, a method for linking database table elements across a plurality of databases is provided. The method comprises submitting a query to a first database wherein a first data element is specified as the query result and a second data element needed to execute the query is resident in the first database. The method also comprises determining that a table including the first data element is not resident in a table in the first database. The method also comprises a software shim component in the first database submitting a request to a second database for data element associations between table columns in the second database that enables linkage of the first data element with the second data element. The method also comprises determining that the first data element is not resident in a table in the second database. The method also comprises a software shim component in the second database submitting a request to a third database for data element associations between table columns in the third database that enables linkage of the first data element with the second data element and determining that the first data element is resident in a table in the third database. The method also comprises a software shim component in the third database determining that at least one combination of data element associations contained in tables in the third database, second database, and the first database link the first data element with the second data element. The method also comprises sending a message containing the at least one combination of data element associations to the software shim component in the first database. The method also comprises the software shim component in the first database providing the location of the first data element to a database management system, the first data element accessible via a selected one of the determined combinations of data element associations across the databases. The method also comprises the database management system using the selected combination of data element associations to access the first data element.

In another embodiment, a method for linking database table elements across a plurality of databases is provided. The method comprises sending a message to databases requesting table association linkages between data elements to discover at least one series of linkages across databases mapping a data element specified in a query result to a data element needed to execute a query. The method also comprises receiving and analyzing a first reply from the databases containing mappings of data elements described in tables in the databases. The method also comprises sending a second message to a second database requesting data element associations, the second database selected as recipient of the second message based on information contained in the first reply. The method also comprises receiving and analyzing second replies from the second database containing further mappings between data elements resident in tables in the second database. The method also comprises combining the mappings of the data elements provided in the first reply with the mappings of the data elements provided in the second reply to discover linking paths across databases associating the data element specified in the query result with the data element needed to execute the query. The method also comprises caching for a predefined period of time the paths of data element associations across databases that permitted the linking of the data element specified in the query result with the data element needed to execute the query. The method also comprises creating a topology of cached linkages of data element associations across databases. The method also comprises publishing the topology for use by trusted databases when processing queries wherein the data element specified in the query result and the data element needed to execute the query are not directly mapped to each other.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
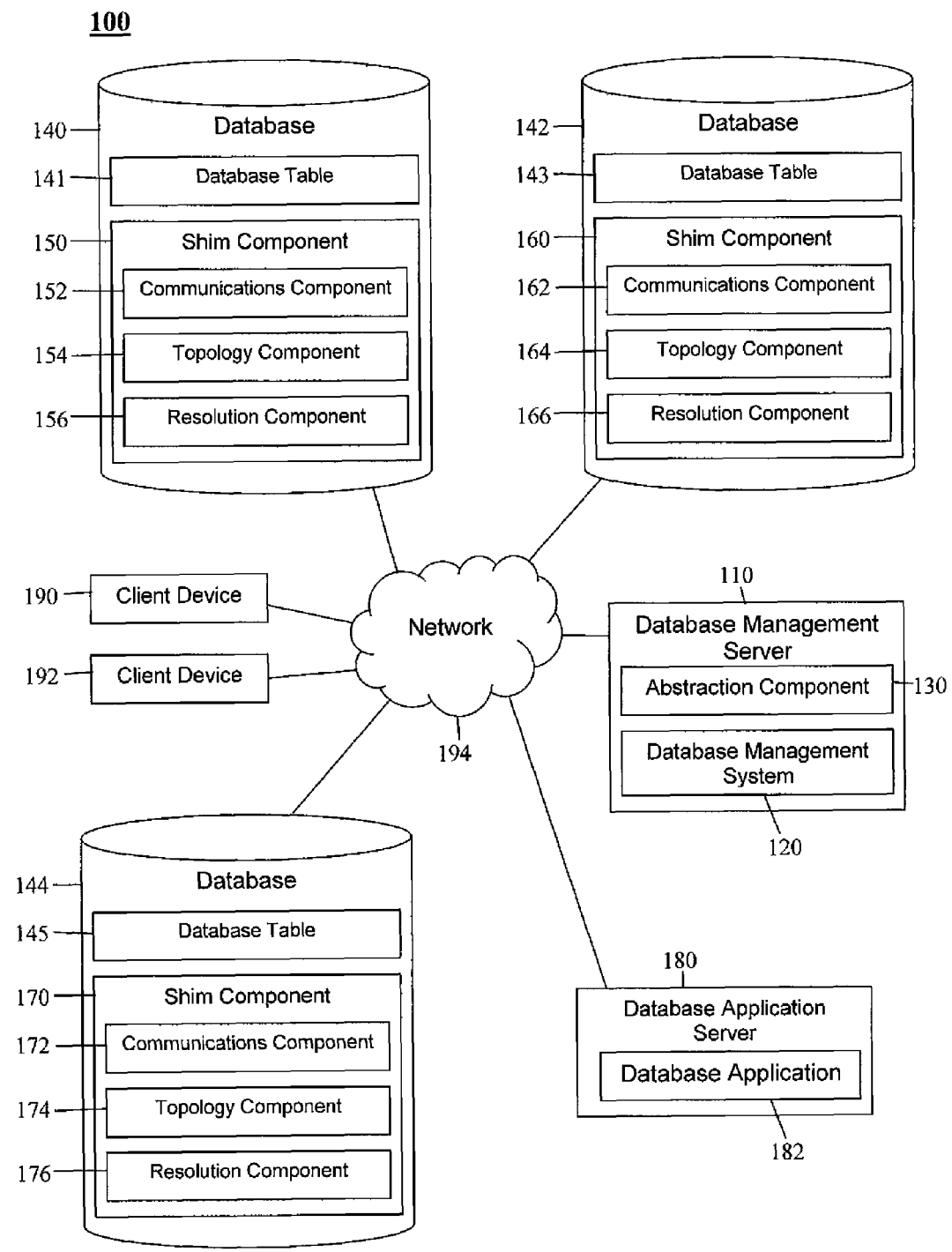
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a database linking system permit a database management system to extend the reach of a query across a plurality of databases and to access data elements located in adjacent and distant databases. The system implements a component in each database to communicate with other databases and identify data element associations in tables across the databases. The system permits each database to share access to data element associations in its own database tables with neighboring databases and build a topology of table element association linkages across databases. In an embodiment, the system is able to extend the reach of the query across a plurality of disparate databases having different database management systems.

Topologies comprise networks of linkages of database table element associations across a plurality of databases. The use of topologies permits interconnected database elements to become available to each database within a trusted group of databases. A query to one database effectively becomes a query to all databases within a trusted group. The system taught by the present disclosure effectively permits linkages of table element associations to be discovered and stored in topologies and the topologies shared among the group of databases.

A database table associates two or more data elements in table columns. In an embodiment, commonly occurring data element such as account number for a mobile phone supplier may be separately associated with other data elements such as customer name, subscription plan, and equipment type in three different databases. While the account number data element is associated directly with each of those three other data elements in three separate databases, it may be difficult to associate any of those three other elements directly with each other, for example to generate a table associating some or all customer names with their corresponding equipment type. The present disclosure provides for this direct association between table elements.

In another embodiment involving the same data elements in a different arrangement, the account number may be associated with customer name in a first database, customer name may be associated with subscription plan in a second database, and subscription plan may be associated with equipment type in a third database. A query to the first database seeking equipment type based on account number would previously fail as the equipment type data element is not found in the first database. In an embodiment, the present disclosure teaches how linkages of data element associations to be discovered across a plurality of databases in a trusted group, promoting the query described above to be executed successfully. A query submitted to the first database may result in messages sent to the other databases. The equipment type data element may be found in the third database and table associations linking equipment type to other data elements and eventually back to account number in the first database may establish the linkage and permit the query to the first database to be successfully executed.

In an embodiment, the present disclosure teaches how databases may discover and store a plurality of such data element linkages across databases in topologies. In an embodiment, a shim component is provided that promotes individual databases to build and share their topologies with other trusted databases. In an embodiment, a shim component resides in each database and stores only the column headings or field names describing the listed data elements in each table within the host database and in databases with which the host database exchanges information in shared topologies. When a linkage of individual data elements is needed to execute a query but cannot be found in a stored topology, shim components may send queries to shim components in other databases to discover paths of data element associations that permit the data elements in a query to be linked. Each database may eventually become aware of the database in the group it can go to for retrieval of the needed information.

Shim components in associated databases may use a common application programming interface to learn and share information. In an embodiment, shim components may observe a common policy to resolve issues when a desired data element is located in two or more different database tables or if a specific data element in two or more places does not have the same value. In an embodiment, a system of metrics may be used to choose between multiple viable paths to desired data elements. For example, metrics may be used to determine the most cost effective path between data elements. Alternatively, the choice between multiple viable paths to desired data elements may be made based on a preferred database and/or a higher level of trust and/or security associated with one of the paths. In an embodiment, shim components within a trusted group may appoint a shim component in a particular database to represent and protect the group when external components seek association with data elements in databases inside the trusted group or when databases in the group may need to establish an association with an external database.

Turning now to FIG. 1, a system 100 of dynamically matrixed database linking is provided. The system 100 comprises a database management server 110, a database management system 120, an abstraction component 130, a database 140, a database table 141, a shim component 150, a database application server 180, a database application 182, a client device 190, and a network 194. In some embodiments, additional shim components 160, 170, additional databases 142, 144, additional database tables 143, 145, and additional client devices 192 will be present and active in the system 100. Attributes and functionality described with reference to the shim component 150 are representative of the attributes and functionality of the additional shim components 160, 170. Attributes and functionality described with reference to the database 140 may be taken to be representative of the attributes and functionality of the additional databases 142, 144. Attributes and functionality described with reference to the database table 141 may be taken to be representative of the attributes and functionality of the additional database tables 143, 145. Attributes and functionality described with reference to the client device 190 may be taken to be representative of the attributes and functionality of the additional client device 192.

The database management server 110 may be a computer system. Computer systems are discussed in greater detail hereinafter. The database management server 110 may comprise one computer or a plurality of computers, for example, a server farm wherein many server computers cooperate to share a processing load. The database management server 110 may comprise a plurality of computers that are located at different places, for example, to provide geographical diversity and increased service reliability. The database management server 110 executes one or more applications that provide services to the client devices 190, 192 including hosting of the database management system 120 and the abstraction component 130.

The database management system 120 is computer software designed for the purpose of managing the databases 140, 142, 144. The database management system 120 controls the organization, storage, management, and retrieval of data in the databases 140, 142, 144.

The abstraction component 130 abstracts the details of the dynamically matrixed database linking system from the database management system 120, the database application 182, and the client devices 190, 192. When a database application 182 submits a query to the database management system 120 and a data element needed to execute the query is located in a different database 142, 144 than the database 140 to which the query was submitted, the query initially may be held in a suspended state by the abstraction component 130. This state lasts until the necessary data elements can be located in at least one database 142, 144 and the path between the data elements needed by the query is determined and provisioned. The abstraction component 130 abstracts or hides these actions from the database application 182 and the database management system 120. The abstraction component 130 may avoid an error being returned to the database management system 120 when the database 140 to which the query was submitted does not contain all of the needed data elements and searching stored topologies and querying other databases 142, 144 becomes necessary. The abstraction component 130 makes a query submitted to a database 140 that is a member of a group of databases 140, 142, 144 using the functionality of the system 100 to appear as a query to the database 140 only. The abstraction component 130 conceals the operation of the shim components 150, 160, 170 as they search their stored topologies, query other databases 140, 142, 144, and determine the path of data element associations across databases 140, 142, 144 to allow the query to be executed. In an embodiment, the database management system 120 and the database application 182 may not directly interact with the abstraction component 130 and shim components 150, 160, 170 and may be unaware that their query may be extended across multiple databases 140, 142, 144. The abstraction component 130 prevents the database management system 120 from making contact with the shim components 150, 160, 170. The shim components 150, 160, 170 may appear to the database management system 120 and other components of the system 100 as database tables.

The abstraction component 130 also coordinates communication between shim components 150, 160, 170 when the shim components 150, 160, 170 exchange topology information and issue requests to discover new paths between data elements across databases to assist in the execution of a query. When it is determined that the data elements needed to execute a query are not all located in the database 140 to which the query was submitted, the shim component 150 in the initially queried database 140 may determine that it needs to communicate with shim components 160, 170 in other databases 142, 144. The other shim components 160, 170 may have linkages of data element associations stored in their topologies that the querying shim component 150 may use to complete its query. Shim components 160, 170 in additional databases 142, 144 may assist the originating shim component 150 in forwarding queries to a larger population of databases to locate the needed data element and determine a path of data element linkages back to the shim component 150 in the originating database 140. In an embodiment, one or more shim components 150, 160, 170 may serve in a gateway shim component role. In this role, the gateway shim component represents the trusted group in sending queries to databases external to the trusted group and in receiving queries from external components.

The shim component 150 may appear as a database table to other components of the database 140 as well as to the database management system 120. The shim component 150 may communicate with other shim components 160, 170. Shim components 150, 160, 170 may exchange a variety of data and instructions as the shim components 150, 160, 170 may need to locate optimal paths between remotely located data elements, resolve issues that may arise during the locating and sharing of data, and build, update, and exchange topology information. Shim components 150, 160, 170 also may need to communicate when a desired data element is located in more than one database or when a data element found in multiple databases is likely the same data element but has different names. The abstraction component 130 may coordinate the communication between shim components 150, 160, 170. The role of the abstraction component in coordinating this communication is implicit in discussion henceforth about shim components 150, 160, 170 interacting with each other and in shielding the database management system 120 from being party to or aware of any of these communications.

The abstraction component 130 also provides the database management system 120 with the provisioning stream of data element associations after the optimal path across databases 140, 142, 144 has been determined. The provisioning stream is the path to the desired data element that permits the query to be executed. In an embodiment, the database management system 120 is only aware that it has submitted a query to a database 140. The actions of the abstraction component 130, the shim components 150, 160, 170, and any other components in determining and provisioning the path between data elements are not visible to the database management system 120. When the path is determined and provided to the abstraction component 130, the abstraction component 130 makes this path between elements available to the database management system 120 in a manner that hides the details of the access process from the database management system 120. The abstraction component 130 may insert a parameter or instruction into a query that when executed by the database management system 120 redirects a data access action to a different database 142, 144 that is not visible to the database management system 120.

The database 140, 142, 144 is a structured collection of records containing data in data tables 141, 143, 145, respectively. The database 140, 142, 144 stores and makes information available to the database application 182 through the database management system 120 installed on the database management server 110 and possibly other server computers that may execute applications unrelated to the system 100.

Data tables 141, 143, 145 are contained within the databases 140, 142, 144, respectively, and are the structures used to store individual data elements. Each vertical column in a table stores one row of data and all of the data values in a column store the same type of data. A data element is the name of the data values in a column, for example account number or user name. Data elements are all of the data values, for example the user names and account numbers listed in columns entitled "user name" and "account number", respectively. A table may have a column entitled "user name" and next to it another column entitled "account number." The two columns together may comprise a series of associations between the two data elements.

The shim component 150, 160, 170 is a software component executing on database servers associated with the databases 140, 142, 144, respectively. The shim component 150 is aware of what is contained in its own database 140 and the relationships between fields in its own database 140. The shim component 150 also recognizes when a query that has been submitted to its host database 140 may require a data element that is not resident in a table in the host database 140. The database 140 with which the shim component 150 is associated may receive a query from the database management system 120 specifying a data element that is not resident in a table in the database 140 or is resident in a table in the database 140 but cannot be linked to the other data element or elements in the query permitting the query to successfully execute. The shim component 150 works with shim components 160, 170 in other neighboring and trusted databases 142, 144 to locate data element associations between tables in those databases 142, 144 that may link together in a series or chain of data element associations permitting the query to execute. The shim component 150 permits a database application 182 to query broader sources of data by permitting a query submitted to one database 140 to effectively be a query to multiple databases 140, 142, 144. The shim component 150, 160, 170 promotes an active relationship between all of the databases 140, 142, 144 to rapidly and economically retrieve the desired information without involving the database management system 120, database application 182, or client devices 190, 192. The shim component 150 henceforth may be referred to as the first shim component 150, the shim component 160 henceforth may be referred to as the second shim component 160, and the shim component 170 henceforth may be referred to as the third shim component 170.

The shim component 150 comprises a communications component 152 that communicates with the abstraction component 130 when all of the data elements needed to execute a query are not resident in data table 141 in the host database 140 and contact with additional databases 142, 144 is necessary to locate the needed data element. Without the presence of the communications component 152 and its interaction with the abstraction component 130, the database 140 would reply back to the database management system 120 that at least one data element specified by the query was not found. The database management system 120 would then fail the query and deliver an error message back to the database application 182. The communications component 152 also exchanges advertisement messages with other shim components 160, 170 that share the topologies they have assembled. Advertisement messages may also notify databases 140, 142, 144 of table element changes, such as a deletion or renaming of a table column, with advice that the databases 140, 142, 144 may need to update their stored topologies. The shim component 150 may also advise other shim components 160, 170 that it has learned of a new path of data associations between two data elements across a group of databases 140, 142, 144. That advice may prompt the recipient shim components 160, 170 to update their own stored topologies with the newly discovered path.

The shim component 150 may use the communications component 152 to determine how the shim component 150 should communicate with shim components 160, 170 in other databases 142, 144 when a stored topology does not contain any known path to a required data element. Shim components 150, 160, 170 exchange inquiries about the location of data elements in various databases 140, 142, 144 and the table relationships between data elements that may provide the needed path of data element associations. Querying to locate a data element in a database 142, 144 that may be distant and conducting recursive or referral-type interaction with other components to locate the best path to the desired data element may involve a series of exchanges between a number of components along the way before the path is established and the query may be executed.

The communications component 152, 162, 172 may use a protocol exclusive to the present disclosure that allows the shim components 150, 160, 170 to communicate with each other via the abstraction component 130. The protocol may provide certain connectors for tables and other components of the databases 140, 142, 144 to access the functionality of the shim components 150, 160, 170.

The shim component 150, 160, 170 also comprises the topology component 154, 164, 174 that receives data element paths discovered by the shim component 150 of the host database 140 or sent to it by shim components 160, 170 of other databases 142, 144. The topology component 154, 164, 174 builds a topology or map of networked data element paths between data elements located across a plurality of databases in a trusted group of databases 140, 142, 144 and perhaps including external databases. Topology components 154, 164, 174 in shim components 150, 160, 170 share all or portions of their topologies with each other and send advertisements with updates and new additions to their stored topologies. Shim components 150, 160, 170 dynamically build their own topologies based on paths they discover in the course of their own query processing. The topology component 154, 164, 174 also may make determinations about the path of associations to take between data elements when more than one path is available. The topology component 154, 164, 174 may also record paths to data elements that are located in reliable data sources distant from the databases 140, 142, 144 such as sources provided by vendors of well known technologies and public sites such as the Local Exchange Routing Guide (LERG) used by telecommunications providers.

Some well constructed topologies may provide a snapshot of all databases 140, 142, 144 to each database 140, 142, 144 in a trusted group and allows each to know where all databases 140, 142, 144 are located and what other databases 140, 142, 144 can be reached from each. A well constructed topology is also periodically edited by the topology component 154, 164, 174 to remove data element associations that are not used or only occasionally used by the host database 140, 142, 144. A topology is not intended to become a substantial database on its own that may eventually become large and difficult to manage. A database 140, 142, 144 only needs to store or cache data association paths that it uses on a regular basis to assist in executing queries. The topology component 154, 164, 174 periodically reviews its stored topology and discards data association paths that the hosting database 140, 142, 144 does not regularly use. How topologies are constructed and used depends on the level of intelligence desired for the shim components 150, 160, 170. In one embodiment, a shim component 150 may store only its own known data association paths and those of the shim components 160, 170 in its neighboring databases 142, 144. Should the need arise to locate a data element in a more distant database, the process of conducting recursive or referral queries to those distant databases may involve several steps. In another embodiment, each shim component 150, 160, 170 may store the entire topology for the trusted group of databases 140, 142, 144.

Various factors may impact decisions on how topologies are constructed, stored, periodically pruned, and shared between shim components 150, 160, 170. These factors may comprise the quantity and structure of databases 140, 142, 144 in a trusted group, the frequency of need for access to data elements that may require queries across databases 140, 142, 144, the costs of processing data element queries, and the costs of storing topology information in databases 140, 142, 144. A party considering these factors must weigh the storage costs of accumulating data element association path information in a topology against the processing costs of instructing databases 140, 142, 144 to regularly send information back and forth between each other.

The shim component 150, 160, 170 also comprises the resolution component 156, 166, 176 that resolves issues that may arise during the interactions of shim components 150, 160, 170 among themselves and with the abstraction component 130. A desired data element may be accessible by two or more valid paths of data element associations across databases 140, 142, 144. The resolution component 156, 166, 176 selects the preferred path at the time a query has been submitted depending on the cost of reaching and accessing the desired data element using each available path. The resolution component 156, 166, 176 also may determine the path to a desired data element by locating the desired data element in a database of record, a database 140 determined to be highly secure, reliable, and/or accessible and used as the default location by the system 100 for that data element. The resolution component 156, 166, 176 also may take into account the reliability of the links between the components in a proposed path of data element associations to a desired data element when considering data element paths. The cost of each available path may depend on database activity and network traffic at the time the query is being processed. The resolution component 156, 166, 176 also may be engaged if a valid path to a desired data element is found but the desired data element has a different name than expected or has a vastly different value than expected, thus raising suspicion about the integrity of the data. The resolution component 156, 166, 176 may intercede when a previously known valid path to a desired data element for any reason fails and an alternative path must be determined. When two or more databases 140, 142, 144 exchange topologies, there is a risk that the information in the exchanged topologies may conflict and the resolution component 156, 166, 176 may be engaged to resolve the conflict.

The resolution component 156, 166, 176 may make or contribute to determinations about the construction, storing, editing, updating, and sharing of data association paths and topologies within and between shim components 150, 160, 170. When information within topologies is not used for a predetermined amount of time, that information may be archived and eventually discarded. When new data association paths between databases 140, 142, 144 are discovered or table headings within databases 140, 142, 144 undergo changes, that information should be shared with other shim components 150, 160, 170. The resolution component 156, 166, 176 determines when and how this information is disseminated across components in the system 100.

In embodiments wherein a large quantity of databases 140, 142, 144 and database tables 141, 143, 145 are in operation, such as in a large corporation or government body, it is conceivable that two or more data table columns in different databases 140, 142, 144 that contain the same data element may receive different names. For example, a column in database table 141 in database 140 that contains the internet protocol address data element may be given the name "IP address" while a highly similar or identical column in database table 143 of database 142 that also contains the same Internet protocol address data element may be given the name "IP addr". This situation could hinder the successful accessing of data elements and prevent properly constructed queries from executing as shim components 150, 160, 170 contain only column names. The resolution component 156, 166, 176 uses the protocol previously discussed to resolve these types of issues so that mappings may be stored between disparately named columns such as "IP address" and "IP addr" and queries successfully execute. In an embodiment, such mappings may have to be manually created and reviewed by parties responsible for overseeing the operation of components of the system 100. These activities may comprise the construction and periodic editing of meta-tables that contain and standardize these mappings between disparately named columns of similar or identical data elements.

The present disclosure contemplates the standardization of database table column headings to avoid nomenclature conflicts of the type described above. The present disclosure also contemplates standardization of data characteristics of data elements. For example, all data elements in database table columns containing internet protocol addresses may comprise a maximum of twelve numeric characters representing standard thirty-two bit internet protocol addressing, for example 122.45.22.220 or 255.255.255.254 or a maximum of thirty-two alphanumeric characters representing the expanded 128 bit internet protocol addressing, for example Odb8:85a3:0000:2001:0000:8a2e:0370:7334.

The resolution component 156, 166, 176 also makes determinations about how shim components 150, 160, 170 trust and communicate with each other through the abstraction component 130 and with components of their host databases 140, 142, 144. In a large group of databases 140, 142, 144, not all shim components 150, 160, 170 may be allowed to freely communicate with all other shim components 150, 160, 170 or send broadcasts or multicasts across the databases 140, 142, 144. The bandwidth of networks hosting the databases 140, 142, 144 may be limited and during busy times the networks may carry the large volumes of data typically generated by database operations. Networks of databases 140, 142, 144 may not always be able to accommodate broadcasts by shim components 150, 160, 170 conducting recursive and referral-based queries. The resolution component 156, 166, 176 may construct a hierarchy of permissions dictating levels of privilege for communication between shim components 150, 160, 170 to streamline communication and assist in reducing network traffic, in particular during times of heavy network use.

The resolution component 156, 166, 176 also may make determinations about the shim components 150, 160, 170 that are authorized to communicate with components, for example databases, that are situated outside a group of trusted databases 140, 142, 144. In an embodiment, executing a query may require accessing a data element and determining a path to a data element that involves databases of uncertain data integrity and security. Conversely, in another embodiment, a database or other component external to the trusted group of databases 140, 142, 144 may request access to a data element inside the trusted group. In both cases, one or more shim components 150, 160, 170 in the trusted group may be appointed to serve as the gateway or border component to provide access and security in either or both the inbound and outbound aspects of these activities. The resolution component 156, 166, 176 performs the duties of appointing and overseeing the shim component(s) 150, 160, 170 handling these responsibilities.

The resolution component 156, 166, 176 may also resolve conflicts arising from different versions of database management system 120 submitting queries to the databases 140, 142, 144. A database 140, 142, 144 may be able to accept queries from database management system 120 provided by two or more different vendors. The resolution component 156, 166, 176 resolves conflicts arising from differences between query structure and query execution details required by the different vendors.

The database application server 180 may be a computer system. The database application server 180 may comprise one computer or a plurality of computers, for example a server farm wherein many server computers cooperate to share a processing load. The database application server 180 may comprise a plurality of computers that are located at different places, for example to provide geographical diversity and increased service reliability. The database application server 180 executes one or more applications that provide services to the client device 190 including the database application 182.

The database application 182 is a software application that executes on the database application server 180. The client device 190 uses the database application 182 to draw data from the database 140 and process the data per the instructions of the client device 190. The database application 182 originates and submits queries to the database management system 120 in accordance with instructions entered by the client device 190. Developers of database applications 182 commonly create frameworks or templates for queries that client devices 190 invoke when making choices within a database application 182. The database application 182 receives the request from the client device 190 and constructs a query based on the template created by the application developer and instructions or parameters supplied by the client device 190. The database management system 120 receives the query from the database application 182 and uses the query instructions to access the database 140. In an embodiment, the database application 182 and database management system 120 may reside on the same physical computer, in which case the database management server 110 and the database application server 180 are not separate devices.

The client device 190, 192 is a device with the capacity to access the database application 182 on the database application server 180 using the network 194, furnish queries, and otherwise seek information from the database 140. The client device 190, 192 may have client software installed to work with the database application 182. In an embodiment, the client device 190, 192 may bypass the database application 182 and make direct contact through the network 194 with the database management system 120. In such an embodiment, the user of the client device 190, 192 may be creating custom queries for processing by the database management system 120.

The network 194 promotes communication between the components of the system 100. The network 194 may be any communication network including a public data network (PDN), a public switched telephone network (PSTN), a private network, and/or a combination thereof.

Figure 2:
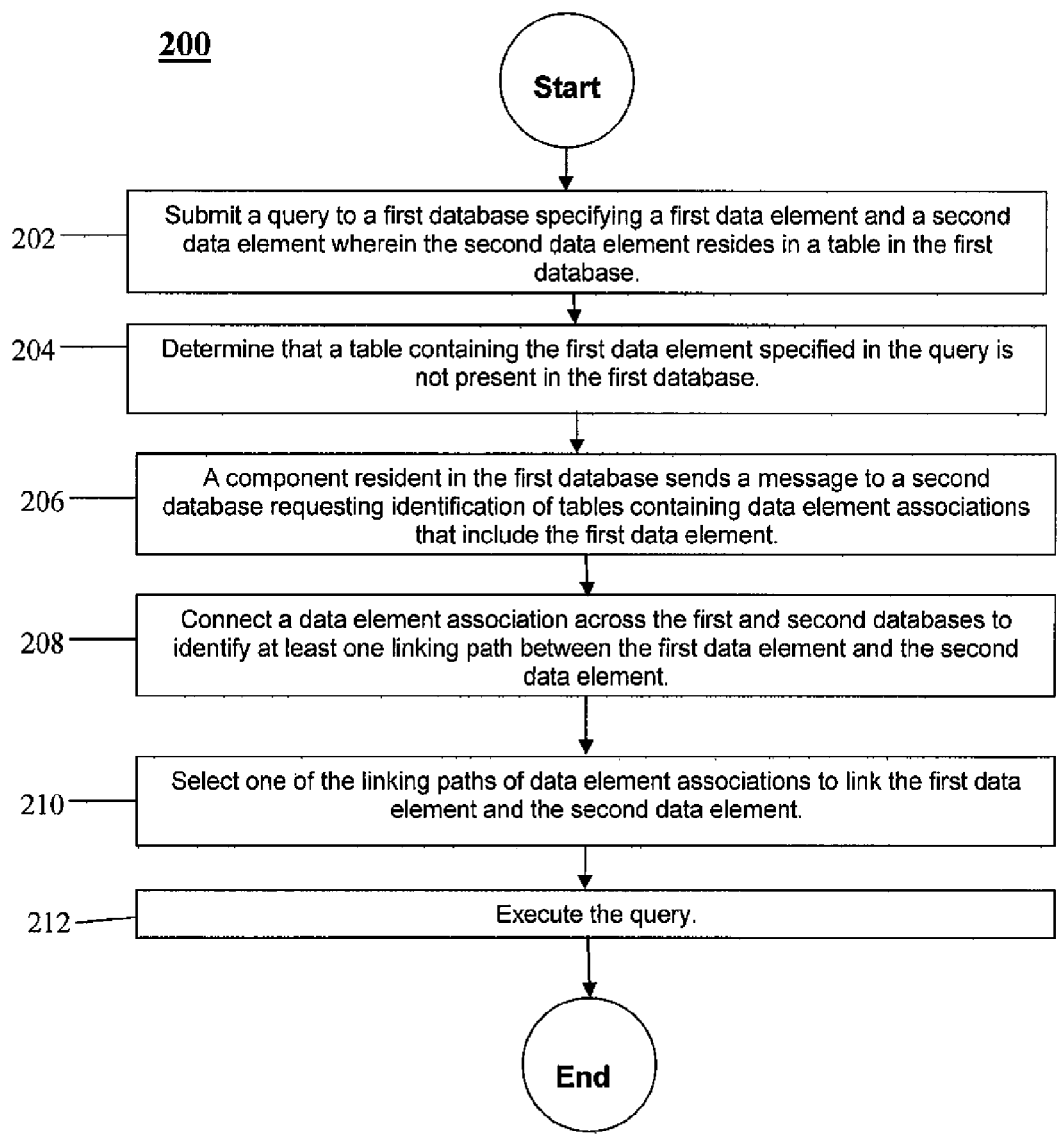
FIG. 2 is a flow chart illustrating a method according to an embodiment of the disclosure.
Figure 3:
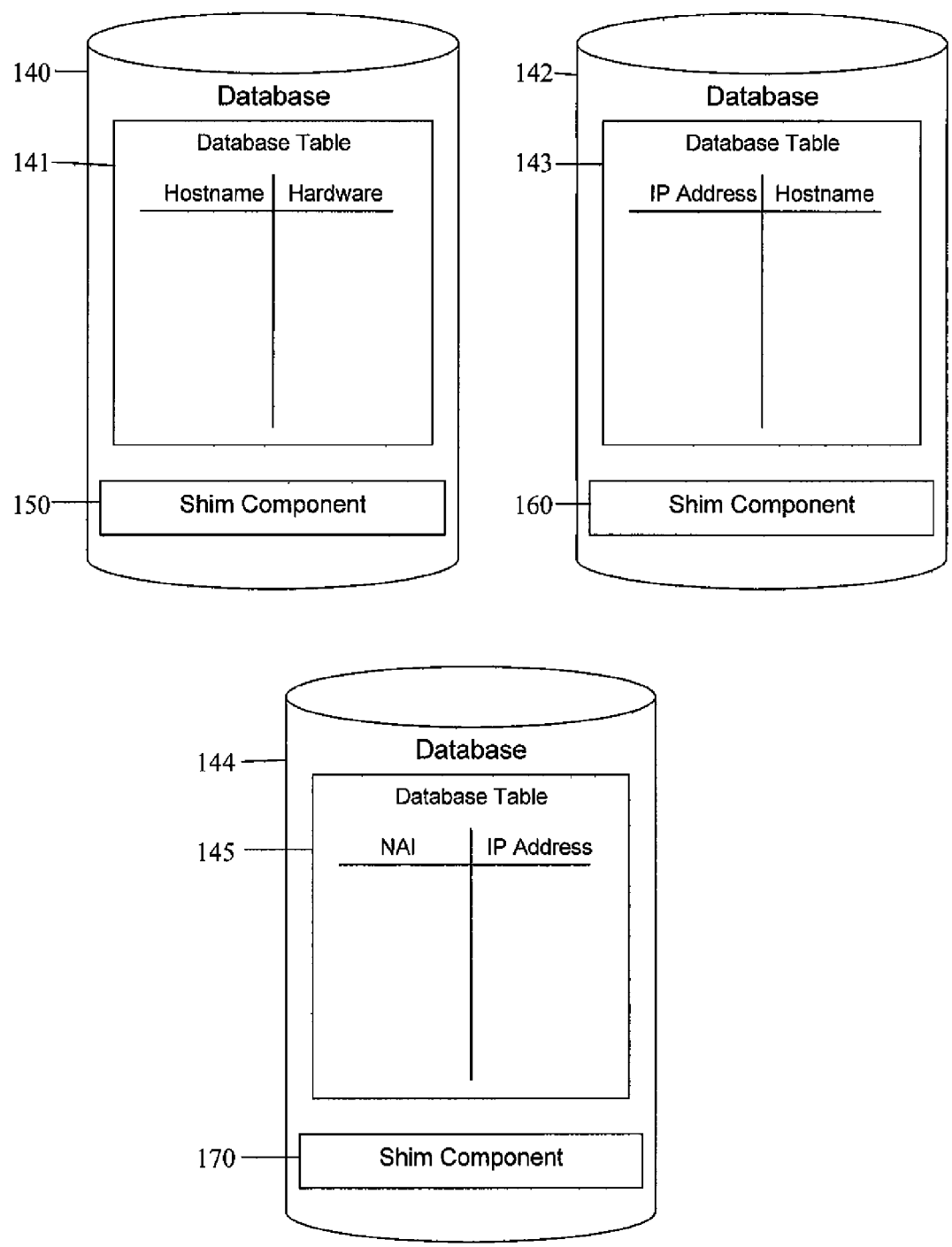
FIG. 3 is a diagram illustrating exemplary contents of separate databases according to an embodiment of the disclosure.

Turning now to FIG. 2, a method 200 of linking database table elements across a plurality of databases 140, 142, 144 is provided. Reference also is made to FIG. 3 that depicts a detailed view of the databases 140, 142, 144 with their respective database tables 141, 143, 145 depicted in an expanded view and their respective shim components 150, 160, 170 depicted in a collapsed view. The column names shown in the database tables 141, 143, 145 are examples and have been inserted for discussion purposes. There is no difference in functionality between components depicted in FIG. 3 and components depicted in FIG. 1. The database tables 141, 143, 145 shown in FIG. 3 have been provided example column names for data elements that might appear in databases 140, 142, 144 used by a telecommunications service provider. In database table 143, the acronym IP address stands for the data element internet protocol address. In database table 145, the acronym NAI stands for network access identifier. In some contexts herein, the database 140 may be referred to as the first database 140, the database 142 may be referred to as the second database 142, and the database 144 may be referred to as the third database 144.

At block 202, the database management system 120 submits a query to the first database 140. In an embodiment, the query submitted is "SELECT NAI where hardware=x". The query is requesting a listing of network access identifiers corresponding to hardware identifications equating to x, wherein x is a set of hardware identifications. As described in block 202, network access identifier is the first data element and hardware identification is the second data element. In the event the data elements network access identifier and hardware identification were located in the same database table, the query may execute with no assistance from components of the present disclosure.

At block 204, it is determined that the first data element, network access identifier, is not present in a data table 141 in the first database 140. This may occur when the database 140 attempts to execute the query and cannot find the network access identifier in the data table 141. The database 140 may generate and send an error message to the database management system 120 which the abstraction component 130 intercepts.

At block 206, the abstraction component 130 notifies the shim component 150 that a query has been submitted to the first database 140 wherein the desired query result specifies a data element, network access identifier, that is not present in the first database 140. The shim component 150 begins by searching its own stored topology of data association paths to determine if it has a stored path from the second data element, hardware identification, which is resident in database table 141, to the first data element, network access identifier, which is not resident in database table 141. If the shim component 150 finds such a path in its stored topology, it provides the path to the abstraction component 130 which provisions the path for the query, and the query executes. When it finds that it does not have such a path in its stored topology, the shim component 150 sends messages via the abstraction component 130 to the shim components 160, 170 in databases 142, 144, respectively, requesting their assistance in locating at least one path of data element associations from the second data element, hardware identification, to the first data element, network access identifier, that may be located somewhere in a database table 143, 145.

At block 208, the shim components 160, 170 begin as shim component 150 did by checking their topologies previously stored. They also check their own database tables 143, 145 and shim component 170 discovers that the network access identifier is in fact a data element in database table 145. The shim components 150, 160, 170 then query each other via the abstraction component 130 to find a data element linkage from network access identifier in database table 145 to hardware identification in database table 141. Through querying, the shim components 150, 160, 170 discover that network access identifier is associated with internet protocol address in database table 145 in database 144, internet protocol address is associated with hostname in database table 143 in database 142, and hostname is associated with hardware identification in database table 141 in database 140. The needed linkage of data element associations has been found. All of these communications between shim components 150, 160, 170 have been coordinated by the abstraction component 130 and the discovered path of data element associations is taken by the abstraction component 130 for its placement with the query.

At block 210, if more than one path of data element associations had been discovered between the first data element, network access identifier, and the second data element, hardware identification, the resolution component 156, 166, 176 would have made a determination of the preferred path to use.

At block 212, the query is executed. The query, which had been held in a suspended state by the abstraction component 130 until a path of data element associations could be found, is released for execution. When the query searches for network access identifier on the database 140, instead of receiving an error, the path discovered by the shim components 150, 160, 170 and provisioned by the abstraction component 130 provides access to the network access identifier in database table 145 situated in database 144. The query executes normally as if the network access identifier was located in database 140 instead of database 144. The database management system 120 may never be aware of the actions that took place between the shim components 150, 160, 170 and the abstraction component 130.

Figure 4:
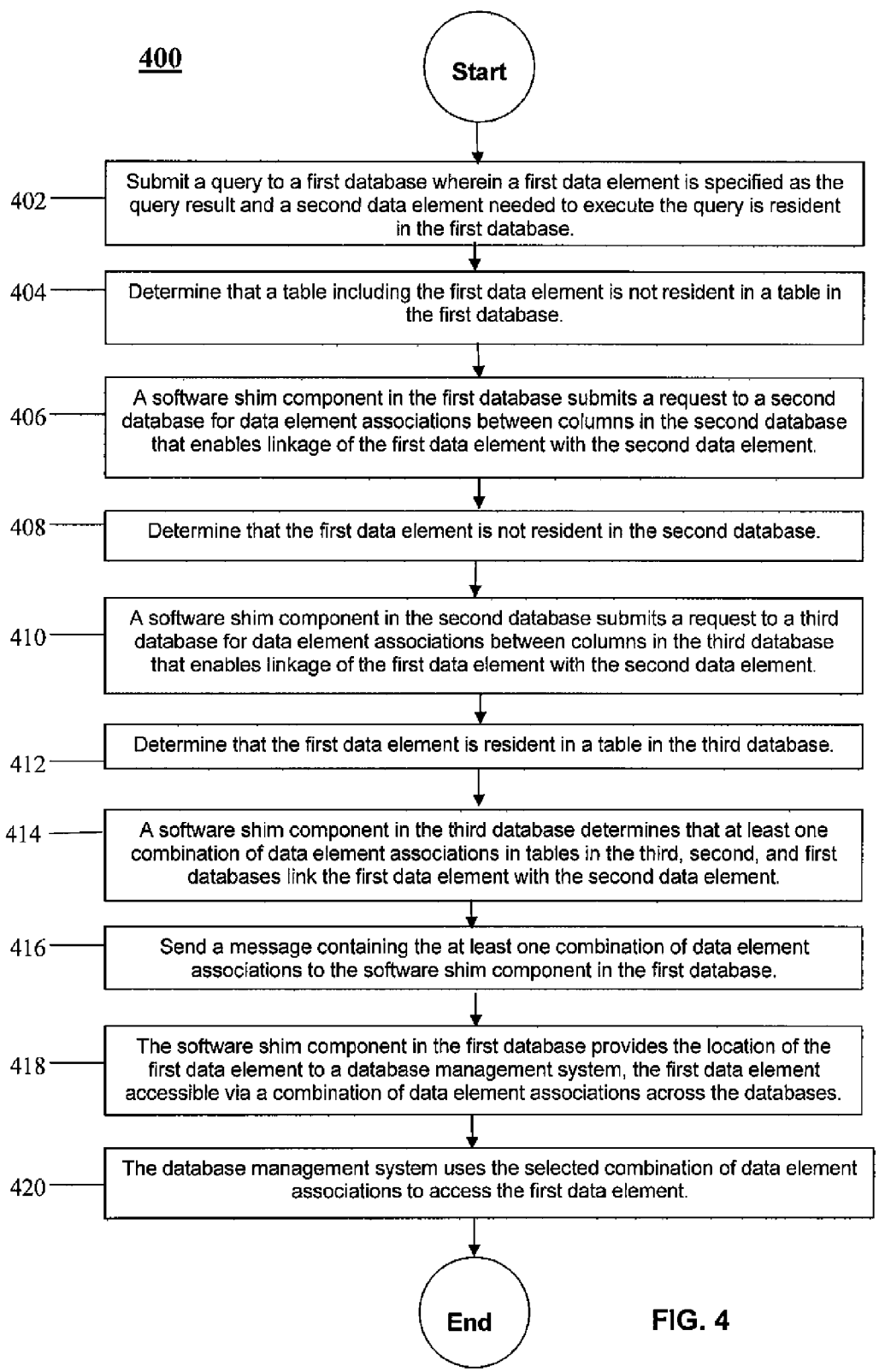
FIG. 4 is a flow chart illustrating another method according to an embodiment of the disclosure.

Turning now to FIG. 4, a method 400 for linking database table elements across a plurality of databases is provided. As with discussion of the method 200, discussion of the method 400 will refer to components depicted in FIG. 3.

At block 402, the database management system 120 submits a query to the first database 140. In an embodiment, the query submitted is "SELECT NAI where hardware=x". NAI is an acronym representing network access identifier and is the first data element noted in block 402. Hardware as noted in the query represents hardware identification and is the second data element described in block 402.

At block 404, the abstraction component 130 receives a message that the database table 141 does not contain the first data element. The message is received from the database 140 and would result in an error being passed to the database management system 120 without the action of the abstraction component 130.

At block 406, the first shim component 150 in the first database 140 sends a message to the second shim component 160 in the second database 142. The message contains a request for assistance in locating data element associations in table columns in the second database 142 that include or point to the location of the first data element, network access identifier, and link it back to the second data element, hardware identification, that is known to exist in the first database 140. As with the method 200, this action would not take place until the first shim component 150 has examined the topology it currently has stored for previously determined paths of data element associations linking the data elements specified in the query.

At block 408, the second database 142 determines that the first data element, network access identifier, is not resident in a table in the second database. The second database 142 may also notify its own resident second shim component 160 as well as the first database 140, its resident shim component 150, and the abstraction component 130. The second database 142 would also have examined the topology it currently has stored for previously determined paths of data element associations.

At block 410, the second shim component 160 in the second database 142 submits a request to the third shim component 170 in the third database 144 requesting assistance in locating data element associations in table columns in the third database 144 that include or point to the location of the first data element, network access identifier, and link it back to the second data element, hardware identification. The communication at block 410 between the second shim component 160 and the third shim component 170 is similar or identical to the earlier communication at block 406 between the first shim component 150 and the second shim component 160.

The steps of the method 400 describe a recursive type of query process in which the second shim component 160 in the second database 142 initiates express action to assist the first shim component 150 in the first database 140 by sending its message at block 410 to the third shim component 170 in the third database 144. The second shim component 160 in effect advises the first shim component 150 that it, the second shim component 160, will attempt to locate the first data element on behalf of the shim first component 150. In a more realistic example, the second shim component 160 may send a series of requests to neighboring or distant databases requesting information about the first data element and requesting suggestions of data path associations that may permit linkages back to the second data element in the first database 140. The second shim component 160 may then receive and examine any responses received and discover and provide a final result containing a valid mapping back to the first shim component 150. By contrast, in a referral type of query process, the second shim component 160, upon receiving the message from the first shim component 150 at block 404, may refer the first shim component 150 to neighboring and distant databases with the first shim component 150 then doing the work in locating the first data element and determining a path of data associations back to the second data element.

Resuming the steps of the method 400, at block 412, having received at block 410 the request from the first shim component 150 for assistance in locating the first data element, network access identifier, the third shim component 170 of the third database 144 searches its own data table 145 for the first data element. The third shim component 170 successfully finds network access identifier in database table 145. The third shim component 170 may notify the second shim component 160 and the first shim component 150 via the abstraction component 130 of its success in locating the requested first data element.

At block 414, the third shim component 170 may consult its own topology or make a request to the second shim component 160 or other components for assistance with linking the first data element, network access identifier, via data element associations back to the second data element, hardware identification, resident in the first database 140. This exemplifies the recursive character of this type of query activity, finding the sought-after first data element and working back through data element associations to link it to the second data element. At block 414, this iterative effort and communication between the shim components 150, 160, 170 via the abstraction component 130 locates the path of data element associations from the database table 145 through the database table 143 to the database table 141. The first data element, network access identifier, is successfully linked to the second data element, hardware identification.

At block 416, the path of data element associations discovered at block 414 is communicated back to the first shim component 150 via the abstraction component 130. At block 418, the location of and path to the first data element is provided by the abstraction component 130 in the query being executed by the database management system 120.

At block 420, the database management system 120 successfully executes the query that may involve invoking instructions or parameters inserted into or otherwise associated with the query by the abstraction component 130 allowing the first data element to be reached across the path of data element associations discovered at block 414. The database management system 120 may not be aware that the instructions or parameters inserted into or associated with the query by the abstraction component 130 involve accessing a data element not located in the first database 140.

Figure 5:
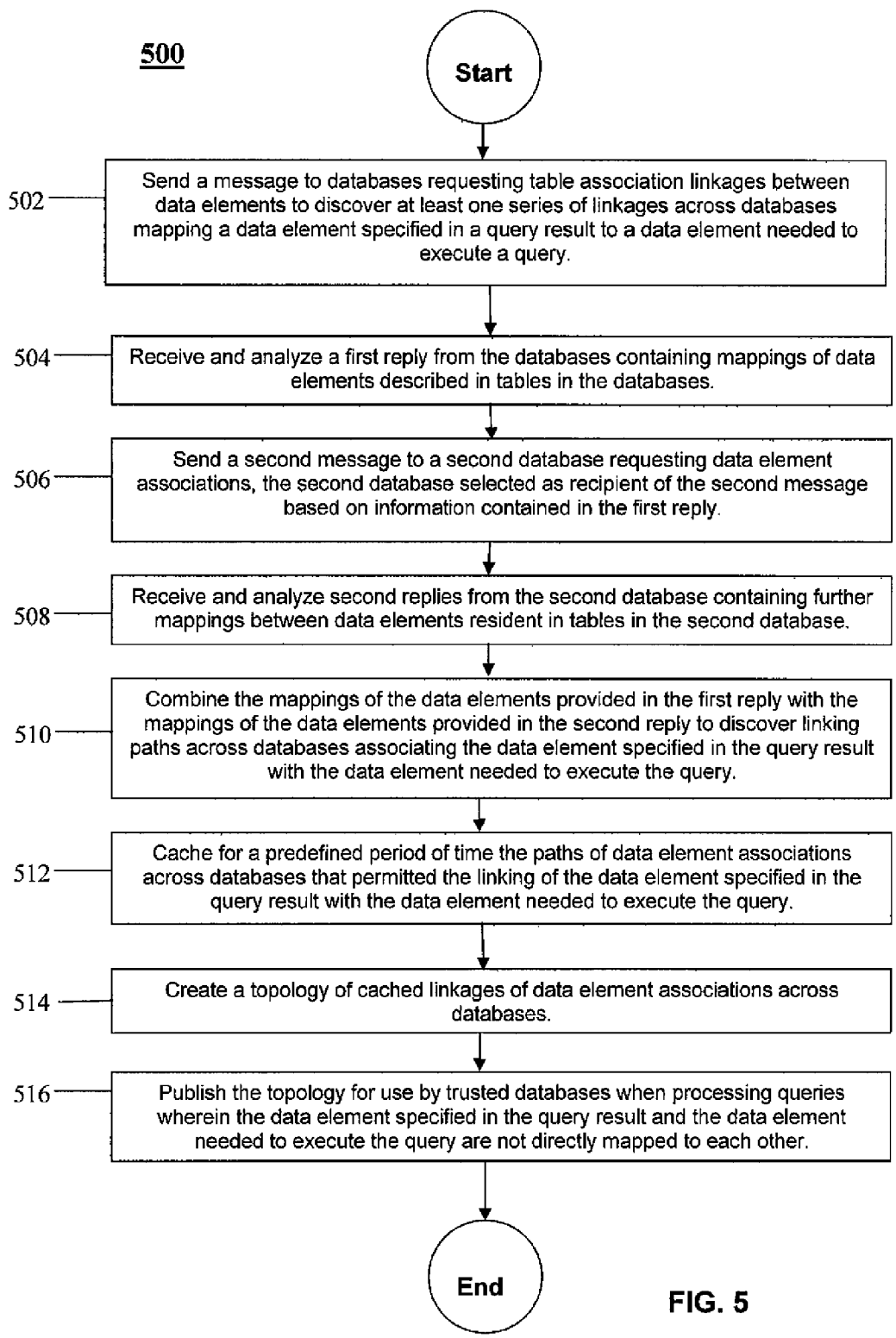
FIG. 5 is a flow chart illustrating another method according to an embodiment of the disclosure.

Turning now to FIG. 5, a method 500 for linking database table elements across a plurality of databases is provided. As with discussion of the method 200 and the method 400, discussion of the method 500 may refer to components depicted in FIG. 3 for discussion purposes only.

At block 502, the first shim component 150 sends a message to shim components 160, 170 located in other databases 142, 144. The message contains a request for table association linkages to discover a path of data associations across databases 140, 142, 144 that may permit a query received by the first database 140 from the database application 182 via the database management system 120 to be executed. In an embodiment, the query received by the first database 140 specifies data elements wherein a first data element, network access identifier, is not located in a database table in the first database 140 and the query specifies a second data element, hardware identification, that is located in database table 141 in the first database 140.

At block 504, the first shim component 150 receives a first reply from the shim components 160, 170 contacted at block 502 containing mappings and data element associations known to the shim components 160, 170 that may be of assistance to the first shim component 150 in mapping the first data element to the second data element. The first shim component 150 analyzes the mappings and data element associations provided by the other shim components 160, 170. The first shim component 150 may use the information to update or replace its own stored topology of data element associations. The first shim component 150 may determine that the information received at block 504 combined with data association information the first shim component 150 was previously aware of is inadequate in establishing a mapping to the needed first data element. In an embodiment, the first shim component 150 may in fact discover one mapping or path of data element associations to the needed first data element but it may be at too high a cost or network policies at the present time may for network traffic reasons prohibit the accessing of the mapping and an alternate mapping must be found.

At block 506, the first shim component 150 sends a second message to additional databases not shown in FIG. 1 or FIG. 3 but may be components of the system 100 similar to the databases 140, 142, 144. Accessing these additional databases may have been suggested by analysis of the information received in the first reply received at block 504. The second message contains requests for assistance similar to those contained in the message contained at block 502.

At block 508, the first shim component 150 receives a second reply. The second reply comprises responses from the additional databases sent the second message at block 506. The second reply contains further mappings and data element associations known to the shim components 160, 170 in the additional databases that may be of assistance to the first shim component 150 in mapping the first data element to the second data element.

At block 510, the first shim component 150 analyzes the mappings and data element associations provided by the other shim components in the additional databases and combines that information and analysis with what it learned at block 504 and information it previously held in its stored topology. Based on this information and analysis, the first shim component 150 is able to determine a path of data associations between the data elements specified in the query permitting a path to be provisioned by the abstraction component 130 and provided to the database management system 120 for execution of the query.

At block 512, the first shim component 150 caches or stores in its topology for a limited period the newly discovered path of data element associations between the data elements specified in the query. The topology component 154 may invoke a policy that sets the time limit within which the path of data element associations may need to be used a specified number of times or otherwise be deleted from the topology. The first shim component 150 may broadcast the new information out to shim components 160, 170 in nearby databases 142, 144 so they may update or expand their stored topologies. In an embodiment, the first shim component 150 may cache for a limited time only the path of data element associations needed to execute the query or it may cache all or a portion of the information received in the first reply and the second reply.

At block 514, if they have not already done so, the shim components 150, 160, 170 build topologies of cached linkages of data element associations across databases used to execute queries when data elements are not all located in the same database. At block 516, the shim components 150, 160, 170 periodically publish for use by each other and other components of the system 100 their stored topologies for use in permitting queries to be executed when the data elements specified in the queries may not all reside in the same database 140, 142, 144.

Figure 6:
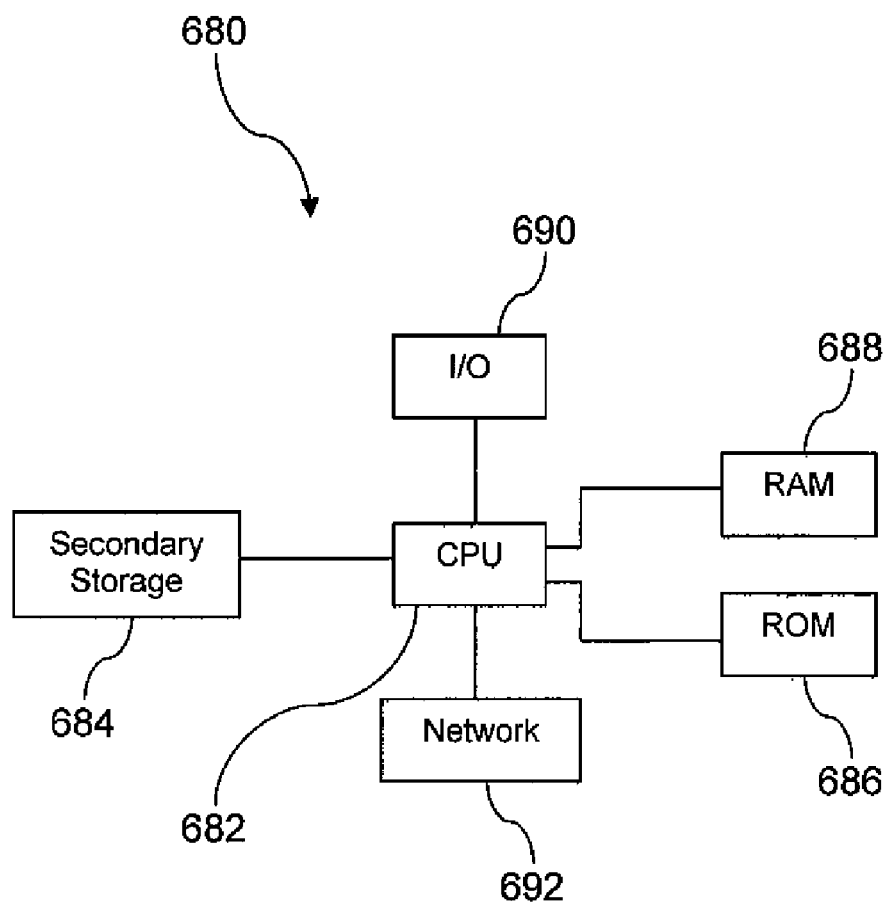
FIG. 6 illustrates an exemplary computer system suitable for implementing some aspects of the several embodiments of the disclosure.

Some aspects of the system described above may be implemented on any computer with sufficient processing power, memory resources, and network throughput capability to handle the necessary workload placed upon it. FIG. 6 illustrates a typical computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

It is understood that by programming and/or loading executable instructions onto the computer system 680, at least one of the CPU 682, the RAM 688, the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for linking database table elements across a plurality of databases, comprising:

submitting a query to a first database wherein a first data element is specified as the query result and a second data element needed to execute the query is resident in the first database;

determining that a table containing the first data element specified in the query is not present in the first database;

in response to said determining that a table containing the first data element specified in the query is not present in the first database, sending, by a shim layer component resident in the first database, a message to a second database requesting identification of tables containing data element associations that include the first data element, wherein the first and second databases are disparate and have different database management systems;

connecting a data element association across the first and second databases to identify at least one linking path between the first data element and the second data element;

selecting one of the linking paths of data element associations to link the first data element and the second data element; and executing the query, wherein the shim layer component resident in the first database communicates with a shim layer component resident in the second database using a communication protocol, wherein the shim layer components resident in the first and second databases create and store topologies containing learned paths between data element associations described in tables in a plurality of databases including the second database, and wherein at least one of the topologies is published within a trusted group of databases for consultation and interlinking by the other shim layer components within the trusted group.

2. The method of claim 1, wherein the shim layer components exchange with shim layer components of trusted databases the stored topologies of learned paths between data element associations described in tables in the plurality of databases.

3. The method of claim 1, wherein the learned paths are deleted from topologies when not used for a predefined period of time.

4. The method of claim 1, wherein shim components in databases belonging to the trusted group do not communicate with shim components in databases not in the trusted group.

5. The method of claim 1, wherein one shim component in a database in the trusted group of databases is designated as a gateway shim component and communicates with shim components in databases external to the trusted group.

6. The method of claim 1, further comprising searching, by the shim layer component resident in the first database, for data element associations in is locally stored topology of learned paths between data element associations before contacting shim components in adjacent databases for assistance.

7. The method of claim 1, further comprising seeking, by the shim layer component resident in the first database, data element associations, wherein the seeking comprises searching on a recursive basis across a plurality of databases.

8. The method of claim 1, further comprising seeking, by the shim layer component resident in the first database, data element associations, wherein the seeking comprises searching on a referral basis across a plurality of databases.

9. A method for linking database table elements across a plurality of databases, comprising:
submitting a query to a first database wherein a first data element is specified as the query result and a second data element needed to execute the query is resident in the first database;
determining that the first data element is not resident in a table in the first database;
in response to said determining that a table including the first data element is not resident in a table in the first database, submitting, by a software shim component in the first database, a request to a second database for data element associations between table columns in the second database that enables linkage of the first data element with the second data element, wherein the first and second databases are disparate and have different database management systems;
determining that the first data element is not resident in a table in the second database;
in response to said determining that the first data element is not resident in a table in the second database, submitting, by a software shim component in the second database, a request to a third database for data element associations between table columns in the third database that enables linkage of the first data element with the second data element, wherein the second and third databases are disparate and have different database management systems;
determining that the first data element is resident in a table in the third database;
determining, by a software shim component in the third database, that at least one combination of data element associations contained in tables in the third database, second database, and the first database link the first data element with the second data element;
sending a message containing the at least one combination of data element associations to the software shim component in the first database;
providing, by the software shim component in the first database, the location of the first data element to a database management system, the first data element accessible via a selected one of the determined combinations of data element associations across the databases; and
using, by the database management system, the selected combination of data element associations to access the first data element, wherein the shim layer component in the first database communicates with the shim layer component in the second database using a communication protocol, wherein the shim layer components in the first and second databases create and store topologies containing learned paths between data element associations described in tables in a plurality of databases including the second database, and wherein at least one of the topologies is published within a trusted group of databases for consultation and interlinking by the other shim layer components within the trusted group.

10. The method of claim 9, wherein communication between the software shim components in the first, second, and third databases is enabled by an abstraction component and the software shim components make client requests to additional databases.

11. The method of claim 10, wherein the abstraction component conceals communication between the software shim components from other database components and database management systems.

12. The method of claim 9, wherein the method processes queries from database management systems provided by multiple vendors.

13. The method of claim 9, further comprising, when at least two combinations of data element associations are found providing access to the first data element, determining a preferred data combination based on reliability of the data sources providing the first data element.

14. The method of claim 9, wherein the shim components contain data element associations comprising column headings from database tables and do not contain the contents of database table cells.

15. The method of claim 9, wherein the method resolves conflicts arising from at least two database tables containing the same data element having different database table names.

16. The method of claim 9, further comprising, when at least two combinations of data element associations are found providing access to the first data element, determining a preferred data combination based on a cost of reaching and accessing the first data element using each combination.

* * * * *